United States Patent

[11] 3,541,902

| [72] | Inventor | Paul J. Weaver<br>Pasadena, California |
|---|---|---|
| [21] | Appl. No. | 716,027 |
| [22] | Filed | March 26, 1968 |
| [45] | Patented | Nov. 24, 1970 |
| [73] | Assignee | True-Trace Corporation<br>El Monte, California<br>a corporation of Connecticut |

[54] TEMPLATE-CONTROLLED MACHINE TOOL
5 Claims, 3 Drawing Figs.

| [52] | U.S. Cl. | 82/14 |
|---|---|---|
| [51] | Int. Cl. | B23b 3/28 |
| [50] | Field of Search | 82/14, 14.1,<br>14.2, 14.3, 14.5 |

[56] References Cited
UNITED STATES PATENTS

| 2,437,570 | 3/1948 | Von Zelewsky | 82/14 |
|---|---|---|---|
| 2,896,490 | 7/1959 | Von Zelewsky | 82/14 |
| 3,146,647 | 9/1964 | Bollman | 82/14 |
| 3,156,144 | 11/1964 | Weaver | 82/14 |
| 3,171,310 | 3/1965 | Lott | 82/14 |

FOREIGN PATENTS

| 326,272 | 1/1958 | Switzerland | 82/14 |
|---|---|---|---|
| 600,196 | 4/1948 | Great Britain | 82/14 |

*Primary Examiner* — Gerald A. Dost
*Attorney* — Angus & Mon

ABSTRACT: This invention relates to a template-controlled machine tool in the nature of a lathe or a chucker, and to a method of machining workpieces. A tracer valve and a tool holder means are mounted to the free one of a pair of stacked slides which can move along a pair of axes disposed obliquely to one another in order to duplicate the configuration of a template in a workpiece. The bed of the machine carries template holder means to be scanned by the tracer valve. According to a preferred feature of the invention, when successive cutting passes are made over the workpiece, the successive templates lie closer to the workpiece, and the successive tools lie closer to the tracer valve, so that the position of the tracer valve becomes closer to the workpiece from pass to pass, thereby reducing inherent tolerance errors in machining the final product.

INVENTOR.
PAUL J. WEAVER

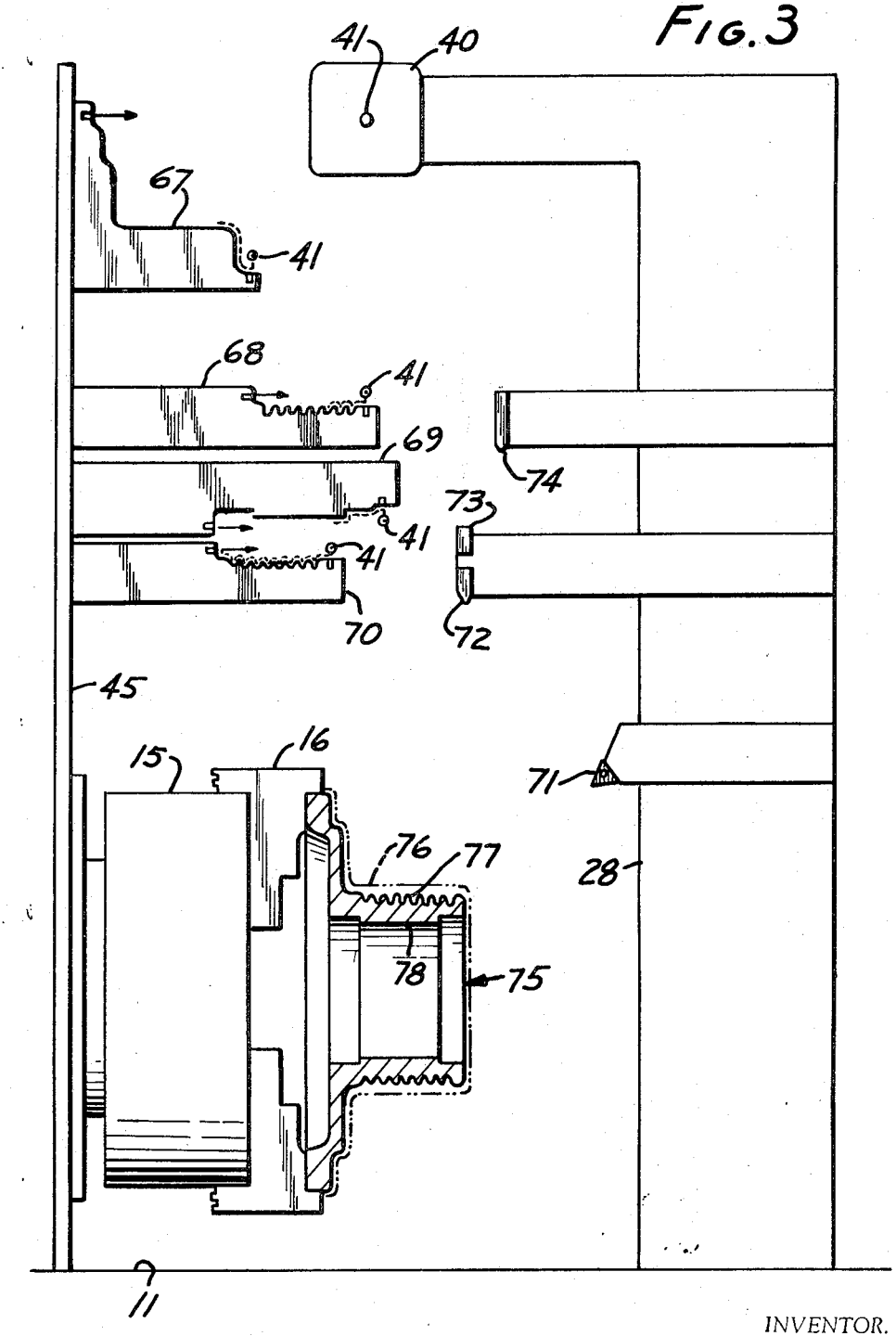

3,541,902

TEMPLATE-CONTROLLED MACHINE TOOL

This invention relates to template-controlled machine tools in the nature of lathes and chuckers which utilize tracer valves for scanning a template and causing cutting tools to move relative to a workpiece in such a manner as to duplicate the contour of the template in the workpiece.

Template-controlled machine tools wherein a tracer valve scans the configuration of the template are well known. It is equally well known that in machining practice, rough cuts are used to quickly remove gross portions of the workpiece, while a subsequent fine cut is used in order to bring the workpiece to the ultimate shape and within the required tolerances. A constantly encountered problem relating to such machining resides in the fact that a tool which is well suited for rapid material removal in a rough cut operation is usually not suitable for making fine cuts, and vice versa. Furthermore, the contour removed in rough cuts is not usually even similar to the contour of the ultimate part. Heretofore, in order to avoid having to machine a workpiece with the use only of a fine-cutting tool, and taking extremely long periods of time to accomplish the job, there has been made either a compromise in the quality of the workpiece, or the machining is done with a plurality of tool setups. In most existing machinery, this inherently involves the rechucking of the workpiece, which introduces many potential errors. What is desirable, of course, is to be able to machine the same workpiece with different tools in successive passes without removing and replacing the workpiece itself. Efforts have been made to attain this objective, one of which is shown in Weaver Reissue U.S. Pat. No. 26,005 wherein a turret includes a plurality of templates and cutting tools provided in pairs, which template is scanned by a fixed tracer valve in order to move a respective cutting tool. After each pass, the turret is indexed to bring another set of templates and cutting tools into operation. Another solution to the problem is shown in Weaver U.S. Pat. No. 3,156,144, wherein again templates and cutting tools are provided in pairs on a slide, the pairs being brought into engagement with a fixed tracer valve in pairs.

The foregoing devices and techniques are a considerable advantage over the compromises and difficulties of the prior art. They do have, however, the objectionable feature that the machine tool tolerances and play of all of the sets are bound together in pairs through the said rigid structure, and that the machine tool tolerances and errors are the same for every set.

Another object is to free the system from an undesirable limitation which results from fixing the tracer valve to the bed, as must be done when the templates and tools are mounted to the same structure. In such an event, the distance from the workpiece centerline to the tracer valve is constant, and so is the distance from the centerline to the point on the template being contacted by the stylus of the tracer valve. Inherent machine errors are thereby determined, and the fixed position is selected as something of a compromise. However, with this invention, the tracer valve moves. In rough cuts, where relatively large errors are tolerable, the tracer valve is relatively far from the center line. However, on fine cuts, the tracer valve is very close to the centerline, so that the inherent errors are greatly reduced when the critical last pass is made over the workpiece.

Still another advantage is that there is a direct, rather than a mirror image relationship between the template and the generated part. The mirror image of part to template shapes in previous machines has caused much difficulty and confusion for machinists, and many have been unable to cope with this relationship.

A template-controlled machine tool according to this invention includes a bed, a driven center rotatably mounted to the bed and having an axis of rotation and adapted to hold and turn a workpiece to be machined. A first ways on the bed extends along a first axis parallel to the axis of rotation, and a first slide is mounted to the first ways and is axially reciprocable thereon. A first motor is interposed between the bed and the first slide for moving the first slide along the first ways.

A second ways is formed on the first slide and is nonparallel to the first axis. A second slide is mounted to the second ways and is axially reciprocable thereon. A second motor is interposed between the first and second slides along the second axis. The second slide is thereby the free member of the pair of slides and is shiftable in a plane which is parallel to the two ways, and to the axis of rotation of the driven center. Template holder means is mounted to the bed and is adapted to hold a rank of templates in general alignment with the second axis. A tracer valve is mounted to the second slide and includes a stylus adapted to trace the configuration of successive ones of the templates held by the template holders and to control the operation of the motors to cause the stylus to follow respective ones of the said configurations.

Tool holder means is mounted to the second slide and adapted to hold a rank of tools in general alignment with the second axis. Power means is applied to the tracer valve which, under control of the tracer valves, operates the motors.

According to a preferred but optional feature of this invention, there is a plurality of pairs of template holders and of tool holder means, the axial spacing along the second axis of successive template holders from the axis of rotation (centerline) being greater for those whose respective tool holder lies farther from the tracer valve along the second axis than for those whose respective tool holder lies nearer to the tracer valve.

According to a method of this invention, a workpiece is machined by successive passes wherein the earlier rough cut passes are formed by following a template which is farther from the axis of rotation of the workpiece than successively traced templates, the respective cutting tools of successive passes lying successively closer to the tracer valve.

The above and other features of this invention will be fully understood from the following detailed description and the accompanying drawings, in which:

FIG. 3 is a plan view of a portion of FIG. 1 illustrating the method of the invention.

Figure 1:
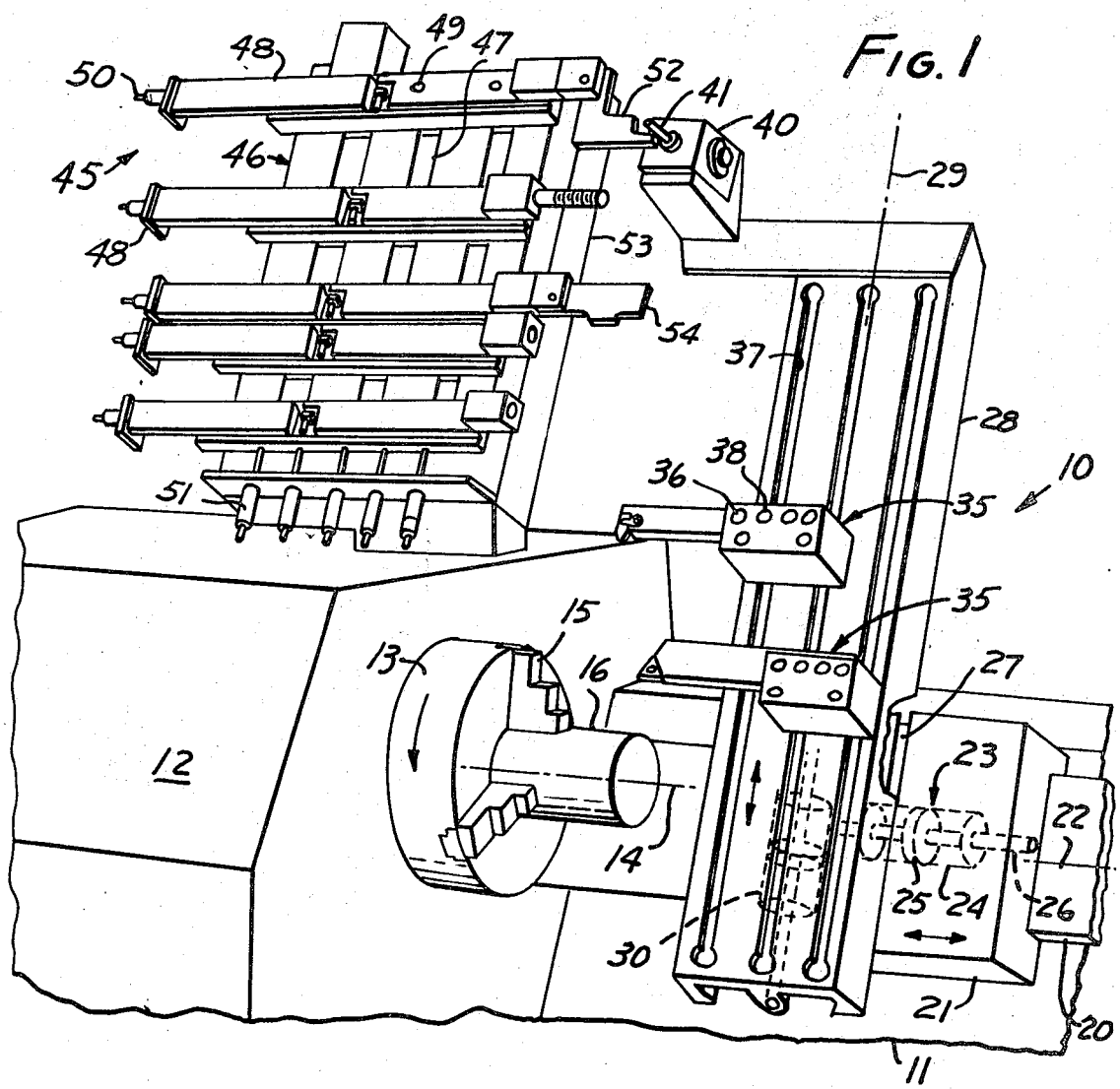
FIG. 1 is a perspective view of a portion of a machine tool according to the invention.

A machine tool 10 according to the invention is shown in FIG. 1 which includes a bed 11 adapted to rest upon a foundation, and a cabinet 12 which includes the customary motors, drives and accessories, for turning workholder means 13 on an axis of rotation 14. This axis is usually parallel to the floor, that is, horizontal. Chuck means 15 is attached to the face plate of the workholder means, thereby forming a means to hold and turn a workpiece 16 in order that it may be cut by appropriate cutting tools. The bed supports a first ways 20 on which slides a first slide 21. This slide is reciprocable along a first axis 22 which is parallel to axis of rotation 14. A first motor 23 is interposed between the bed and the first slide to reciprocate the first slide. It may conveniently be a conventional piston cylinder assembly including a cylinder 24, a piston 25 and a rod 26 mounted to the piston. Either the slide or the bed is connected to the cylinder, and the other is connected to the rod in order that differential fluid pressure in the cylinder on one side or the other of the piston will move the slide in the respective direction.

A second ways 27 is formed on the first slide and to it is mounted a second slide 28. The second slide is reciprocable along a second axis 29 which is nonparallel (oblique) to the first axis. In the preferred embodiment in overlay plan view, they would appear perpendicular, and the second slide would be tilted relative to the horizontal. A second motor 30 of the same class as motor 23 is interposed between the first and second slides in order that the second slide will reciprocate along the second axis.

Tool holder means 35 is mounted to the second slide. This means may conveniently be blocks 36 which are adjustably mounted to key ways 37 on the slide, and carry means for clamping a tool to the respective block. Attachment means 38, such as hold-down bolts, is provided such that respective tool holders may move in respective ones of the key ways so that the location of the individual tool holders relative to the second slide can be adjustably selected.

A tracer valve 40 of the general class shown in Paul J. Weaver U. S. Pat. No. 3,161,095, issued Dec. 15, 1964, is mounted to a flange on the second slide so as to move with the second slide. The tracer valve includes a stylus 41 adapted to scan the configuration of a pattern or template (hereinafter referred to as a template) in order to adjust the internal workings of the tracer valve so as to control flow of hydraulic fluid under pressure to the motors so as to cause the first and second slides to move in such a manner as to cause the stylus to trace along the configuration of the template, thereby causing the cutting tool to reproduce a like path in space and cut a geometrically similar configuration in the workpiece.

Template holder means 45 is mounted to the bed. This conveniently includes a base plate 46 mounted directly to the bed and mounted at an angle such as to be parallel to the plane in which the second slide moves. A plurality of slide ways 47 is formed in the base plate extending parallel to the second axis, and to these are mounted a group of template holders 48 whose longitudinal and cross position can readily be shifted. hold-down bolts 49 hold the holders to the base plate at positions determined by longitudinal adjustment means 50 and cross adjustment means 51. Templates such as templates 52, 53, 54 are mounted to respective ones of the holders at the respective positions where they are to be traced by the stylus of the tracer valve.

Figure 2:
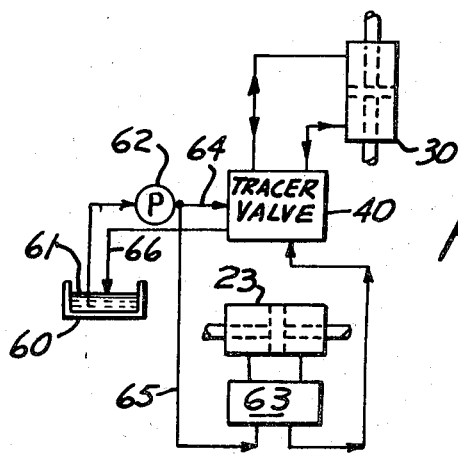
FIG. 2 is a schematic circuit diagram of a power circuit for the device of FIG. 1.

FIG. 2 shows a power system suitable for operating the motors under the control of the tracer valve. A reservoir 60 contains hydraulic fluid 61. A pump 62 withdraws fluid and places it under pressure and supplies it to the tracer valve, and to a four-way selector valve 63. Tracer valve 40 is supplied through line 64, and selector valve 63 through line 65. The tracer valve is of the type shown in the aforementioned Weaver patent. It includes a four-way selector section which, in the illustrated embodiment, controls the cross motion by controlling motor 30. The same valve spool carries a coordinator section which regulates the speed of the other motor, in the case illustrated, motor 23, which is the longitudinal motion. Crossover valves could be provided to reverse the sections so as to control the other motor, if desired, so as to make the feed axis the cross axis instead of the longitudinal axis. Valve 63 selects the direction of feed by selecting which side of motor 23 (or of motor 30 if the cross axis is to be the feed axis) is under pressure from line 65.

The coordinator section throttles the exhaust flow from the motor which controls the feed axis, and this flow is discharged through line 66 along with the exhaust from the four-way section of the tracer valve. Full details of such a tracer valve and flow pattern will be found in the said Weaver patent.

Now with respect to FIG. 3, the scheme of the invention is more fully described. In this FIG., four templates 67, 68, 69, 70 are shown, together with four cutting tools 71, 72, 73, 74. These templates and tools are used in pairs, the pairs being 67—71, 68—72, 69—73, and 70—74. A workpiece 75 is shown mounted to the work holder means and is to be formed to an ultimate configuration in a plurality of passes. The first pass will be accomplished by the use of tool 71 on the workpiece when the stylus is traced over the configuration of template 67. This will cut the configuration shown by line 76. This is a roughing cut, and the tracer valve is spaced relatively far from the center line.

The next operation is the formation of a number of circular grooves accomplished by the use of cutting tool 72 and template 68. The tracer valve is closer to the center line than in the previous pass. The resulting configuration is shown by line 77.

Next, an inner bore shown by line 78 is formed, utilizing tool 73 and the configuration at the lower edge of template 69. It will be noted that tools 72 and 73 are both mounted to the same holder, but to different sides thereof showing a means for minimizing the bulk of the tool for a plurality of operations. Finally, a finish cut is made on grooves 77 with tool 74 following the configuration of the upper edge of template 70. The tracer valve is closer to the centerline in this final step than in any of the previous passes, and closer tolerances can be held.

Without any change in setup and without any rechucking, four passes have been made, from rough to fine cuts, utilizing a single tracer valve, and with increasingly fine tolerances.

It will also be noted, and this is of considerable importance to this invention, that when the template 67 is being followed doing rough work, this template is the farthest from the axis of rotation, and the respective tool is the farthest from the tracer valve, and the tracer valve is farthest from the centerline It accordingly follows that angular errors, inherent machine tool errors and the like will be greater for this pass than for the later ones, but because this is a roughing operation, it is unimportant. Successive pairs of templates and tools involve members which when used are increasingly closer to the centerline, as is the tracer valve when scanning them, until finally in the fine cutting operation utilizing template 70, all members are quite close to the centerline thereby bringing down to a minimum any latent inaccuracies. It is thereby possible to set up this device for multiple passes with a single tracer valve and a plurality of tools to bring about at the close tolerance passes, conditions wherein minimum errors are likely to be encountered. Furthermore, this is accomplished in a machine tool wherein the relative positioning between the devices is easily adjusted, and in which there is a direct visual relationship between template shape and workpiece shape, rather than a mirror image.

The foregoing also describes the method of this invention, utilizing templates which are progressively closer to the center of rotation, tools which are progressively closer to the tracer valve for making respective cuts, and a tracer valve which also approaches the centerline.

It will be noted that the tool-template arrangement of FIG. 1 is not arranged for a specific setup, but is intended merely to illustrate the general construction of the invention. The arrangement shown in FIG. 3 is for an actual setup utilizing four tools and four templates. It will be noted that the template holder means provides the templates in a rank which is generally aligned with the second axis, although no two are necessarily aligned with the second axis, and no one of them is necessarily parallel or normal to it. The same is true of the cutting tools themselves wherein the tools are in a rank generally aligned with the second axis, the point being that movement of the second slide along the second axis can bring the tracer valve into alignment with successive templates when the respective cutting tool is brought into alignment with the position on the workpiece where cutting should begin.

This invention is not to be limited by the embodiment shown in the drawings and described in the description, which is given by way of example and not of limitation, but only in accordance with the scope of the appended claims.

I Claim:

1. A tracer-controlled machine tool comprising: a bed; a driven center rotatably mounted to the bed and having an axis of rotation and adapted to hold and turn a workpiece to be machined; a first ways on said bed extending along a first axis parallel to the said axis of rotation; a first slide mounted to said first ways and axially reciprocable thereon; a first motor interposed between the bed and the first slide for moving said first slide along the first ways; a second ways on said first slide and nonparallel to said first axis; a second slide mounted to said second ways and axially reciprocable thereon; a second motor interposed between the first and second slides along the second axis; the second slide thereby being shiftable in a plane which is parallel to the said axis of rotation; template holder means mounted to the bed and adapted to hold a rank of a plurality of templates in general alignment with said second axis; a tracer valve mounted to said second slide and having a stylus adapted to trace the configuration of successive ones of said templates, and to control the operation of said motors to cause the stylus to follow respective ones of the said configurations; and a tool holder means mounted to said second slide and adapted to hold a rank of a plurality of tools in general alignment with said second axis; and power means applied to said tracer valve which, under control of said tracer valve, operates said motors, the tracer valve being able to approach all of the templates from the same side in succession, thereby being able to bring all tools to bear against the same side of the workpiece.

2. A tracer-controlled machine tool according to claim 1 in which a template holder support is mounted to said bed and includes adjustable means for holding said template holder means thereto at selected locations along a path lateral to the axis of rotation, and in which the second slide includes adjustable means for holding said tool holder means thereto at selected locations along a path lateral to the axis of rotation, the template holder support and tool holder means being parallel to each other.

3. A tracer-controlled machine tool according to claim 2 in which there is a plurality of pairs of template holders and of tool holder means, the spacing along the said lateral path of successive template holders from the axis of rotation being greater for those whose respective tool holder lies farther from the tracer valve along said lateral path, than for those whose respective tool holder lies closer to the tracer valve.

4. A tracer-controlled machine tool according to claim 3 in which the second ways is inclined to the base of the bed.

5. A tracer-controlled machine tool according to claim 1 in which one of said motors is under the bidirectional control of said tracer valve, and in which the other of said motors is under the unidirectional control of said tracer valve.